(12) United States Patent
Lin

(10) Patent No.: US 8,098,043 B2
(45) Date of Patent: Jan. 17, 2012

(54) INDUCTION TYPE POWER SUPPLY DEVICE

(75) Inventor: Jung-Tsung Lin, Zhonghe (TW)

(73) Assignee: Fu Da Tong Technology Co., Ltd., Zhonghe, Taipei County (TW)

( * ) Notice: Subject to any disclaimer, the term of this patent is extended or adjusted under 35 U.S.C. 154(b) by 345 days.

(21) Appl. No.: 12/430,880

(22) Filed: Apr. 27, 2009

(65) Prior Publication Data
US 2009/0267561 A1 Oct. 29, 2009

(51) Int. Cl.
H02J 7/00 (2006.01)
(52) U.S. Cl. ........................................ 320/108; 320/107
(58) Field of Classification Search .................... 320/108
See application file for complete search history.

(56) References Cited

U.S. PATENT DOCUMENTS

| 7,239,110 | B2 * | 7/2007 | Cheng et al. | 320/108 |
| 7,602,142 | B2 * | 10/2009 | Weber et al. | 320/108 |
| 7,906,936 | B2 * | 3/2011 | Azancot et al. | 320/108 |
| 7,948,208 | B2 * | 5/2011 | Partovi et al. | 320/108 |

* cited by examiner

Primary Examiner — Huy Q Phan
Assistant Examiner — Alesa Allgood
(74) Attorney, Agent, or Firm — Muncy, Geissler, Olds & Lowe, PLLC

(57) ABSTRACT

An induction type power supply device includes a power supply base unit having a connection interface connectable, an oscillator circuit for producing an AC signal upon connection of the connection interface to an electric outlet, a driver circuit for amplifying the AC signal and a primary inductor for obtaining a resonant frequency and releasing the AC signal, and an attached induction device placed on the power supply base unit and having a secondary inductor for receiving the AC signal from the primary inductor by means of magnetic induction, a rectifier filter circuit for converting the AC signal into a DC power supply, a power management circuit for regulating the DC power supply subject to a predetermined voltage and current value and a connection device for the connection of an external mobile electronic apparatus and for outputting the regulated DC power supply from the power management circuit to the connected external mobile electronic apparatus.

10 Claims, 11 Drawing Sheets

INDUCTION TYPE POWER SUPPLY DEVICE

This application claims the priority benefit of Taiwan patent application number 097207329 filed on Apr. 28, 2008.

BACKGROUND OF THE INVENTION

1. Field of the Invention

The present invention relates to power supply devices and more particularly an induction type power supply device, which comprises a power supply base unit connectable to an electric outlet to obtain an AC power supply, and an attached induction device placed on the power supply base unit for receiving the AC power supply from the power supply base unit by means of magnetic induction and converting the AC power supply into the desired DC power supply for output to an external mobile electronic apparatus being connected thereto.

2. Description of the Related Art

With the coming of digital era, many digitalized electronic products, such as digital camera, cellular telephone, music player (MP3) etc., have been continuously developed and have appeared on the market. These modern digital electronic products commonly have light, thin, short and small characteristics. For high mobility, power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, it is not economic to purchase a respective battery charger when buying a new mobile electronic product.

Further, when using a battery charger to charge the rechargeable battery of a mobile electronic product, it is necessary to connect the connection interface of the battery charger to an electric outlet and then insert the power output plug of the battery charger to the power jack of the mobile electronic product. After charging, the user needs to remove the battery charger from the mobile electronic product. When wishing to charge the rechargeable battery of a mobile electronic product, the user must carry the mobile electronic product to a place where there is an electric outlet. When one goes out and there is no any electric outlet available, the user will be unable to charge the rechargeable battery of his(her) mobile electronic product.

The use of a conventional battery charger has the drawbacks as follows:

1. When using many different mobile electronic products, one shall have to prepare many different battery chargers for charging the mobile electronic products separately. It costs a lot to prepare many different battery chargers.

2. A conventional battery charger can be used to charge a mobile electronic product only where there is an electric outlet. When one goes out to a place where there is no any electric outlet and the power of the rechargeable battery of his(her) mobile electronic product is low, he(she) will be unable to charge the mobile electronic product in time.

Therefore, it is desirable to find a way that eliminates the aforesaid problems.

SUMMARY OF THE INVENTION

The present invention has been accomplished under the circumstances in view. It is one object of the present invention to provide an induction type power supply device, which is practical for use to charge different mobile electronic products. It is another object of the present invention to provide an induction type power supply device, which is practical for use outdoors to charge different mobile electronic products with self-provided storage battery.

To achieve these and other objects of the present invention, an induction type power supply device comprises a power supply base unit having a primary inductor, and an attached induction device having a secondary inductor. When placed the attached induction device on the power supply base unit after connection of the power supply base unit to an electric outlet, the attached induction device obtains an AC signal from the power supply base unit by means of magnetic induction and converts the AC signal into a DC signal for charging an external mobile electronic product. Further, different attached induction devices with different connection interfaces can be used with the power supply base unit to charge different mobile electronic products having different connection interfaces.

In one embodiment of the present invention, the attached induction device has installed therein a charging module, which comprises a charging circuit and a rechargeable battery and connected in series between a rectifier filter circuit and a power management circuit. Normally, the rechargeable battery stores battery power. When the user goes out, the attached induction device can be used to charge a mobile electronic product when the power of the rechargeable battery of the mobile electronic product is low and when there is no any electric outlet available.

In another embodiment of the present invention, the power supply base unit has installed therein a feedback circuit, a primary control circuit, and an oscillator circuit. The feedback circuit feeds back the voltage of the resonant circuit of the primary inductor to the primary control circuit for comparison with a predetermined reference voltage so that the primary control circuit outputs a control signal to the oscillator circuit to regulate the resonant frequency subject to the comparison result.

DETAILED DESCRIPTION OF THE PREFERRED EMBODIMENT

Figure 1:
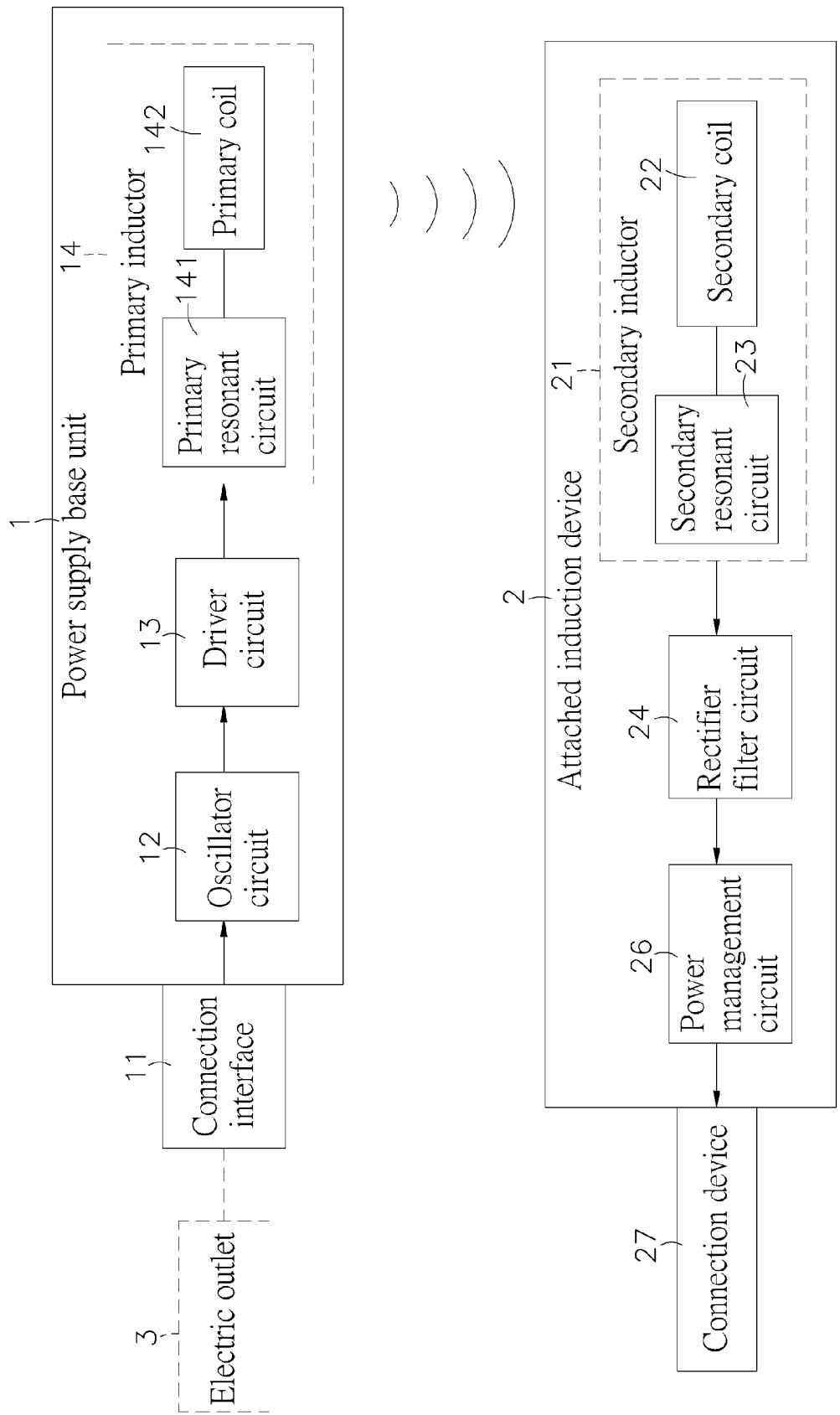
FIG. 1 is a circuit block diagram of an induction type power supply device in accordance with a first embodiment of the present invention.

Referring to FIG. 1, an induction type power supply device in accordance with a first embodiment of the present invention is shown comprising a power supply base unit 1 and an attached induction device 2.

The power supply base unit 1 comprises a connection interface 11, an oscillator circuit 12 (either frequency modulable type or non-frequency modulable type), a driver circuit 13, and a primary inductor 14, which has installed therein a primary resonant circuit 141 and a primary coil 142. The connection interface 11, the oscillator circuit 12, the driver circuit 13 and the primary inductor 14 are electrically connected in series.

The attached induction device 2 comprises a secondary inductor 21 having installed therein a secondary coil 22 and a secondary resonant circuit 23, a rectifier filter circuit 24, a power management circuit 26, and a connection device 27. The secondary inductor 21, the rectifier filter circuit 24, the power management circuit 26 and the connection device 27 are electrically connected in series.

After connection of the connection interface 11 of the power supply base unit 1 to an electric outlet 3, the oscillator circuit 12 is electrically connected to produce an AC signal, which is then amplified by the driver circuit 13 and then sent to the primary resonant circuit 141 of the primary inductor 14 to obtain resonance, and then the AC signal is released through the primary coil 142.

As stated above, the secondary inductor 21 of the attached induction device 2 has installed therein a secondary coil 22 and a secondary resonant circuit 23. When the secondary coil 22 is set in proximity to the primary coil 142 of the power supply base unit 1, it releases the AC signal to the secondary resonant circuit 23 for converting into DC power supply by the rectifier filter circuit 24. The DC power supply thus obtained is regulated by the power management circuit 26 to provide the desired voltage and current to an external mobile electronic apparatus 4 via the connection device 27. Further, the connection device 27 can be a USB (Universal Serial Bus), Mini USB (Mini Universal Serial Bus), or any suitable electric connection interface.

Figure 2:
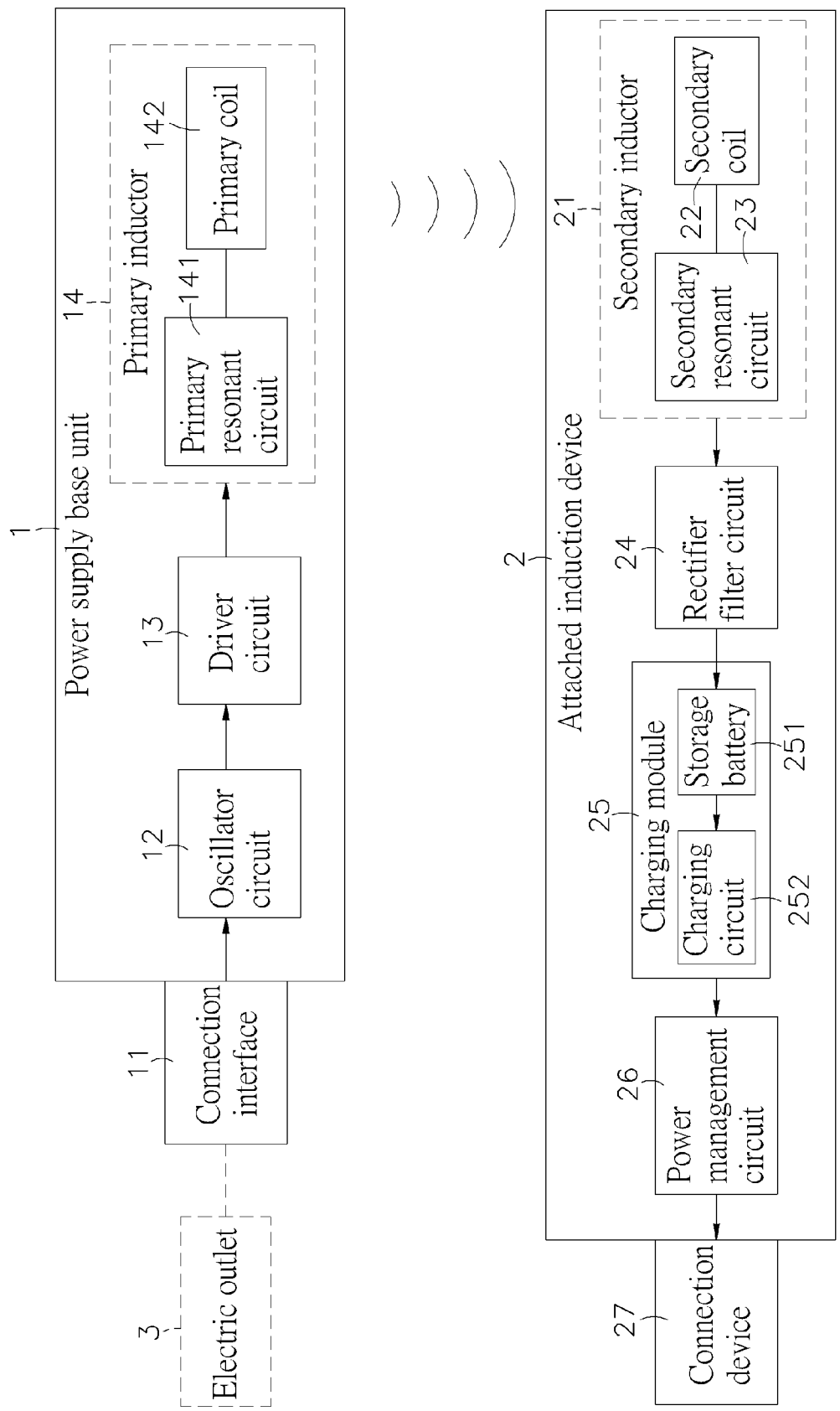
FIG. 2 is a circuit block diagram of an induction type power supply device in accordance with a second embodiment of the present invention.
Figure 3:
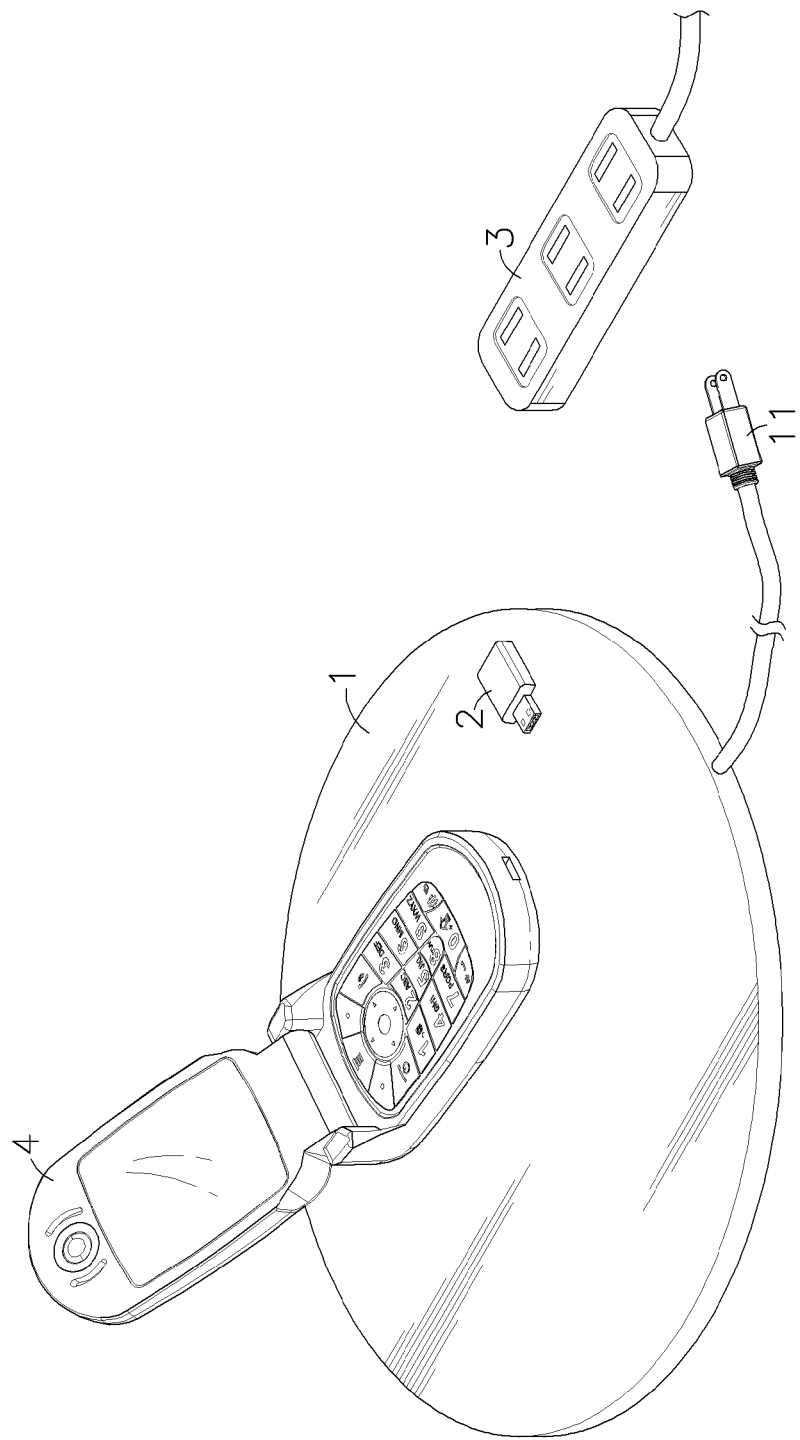
FIG. 3 is a schematic drawing showing an application example of the present invention.
Figure 4:
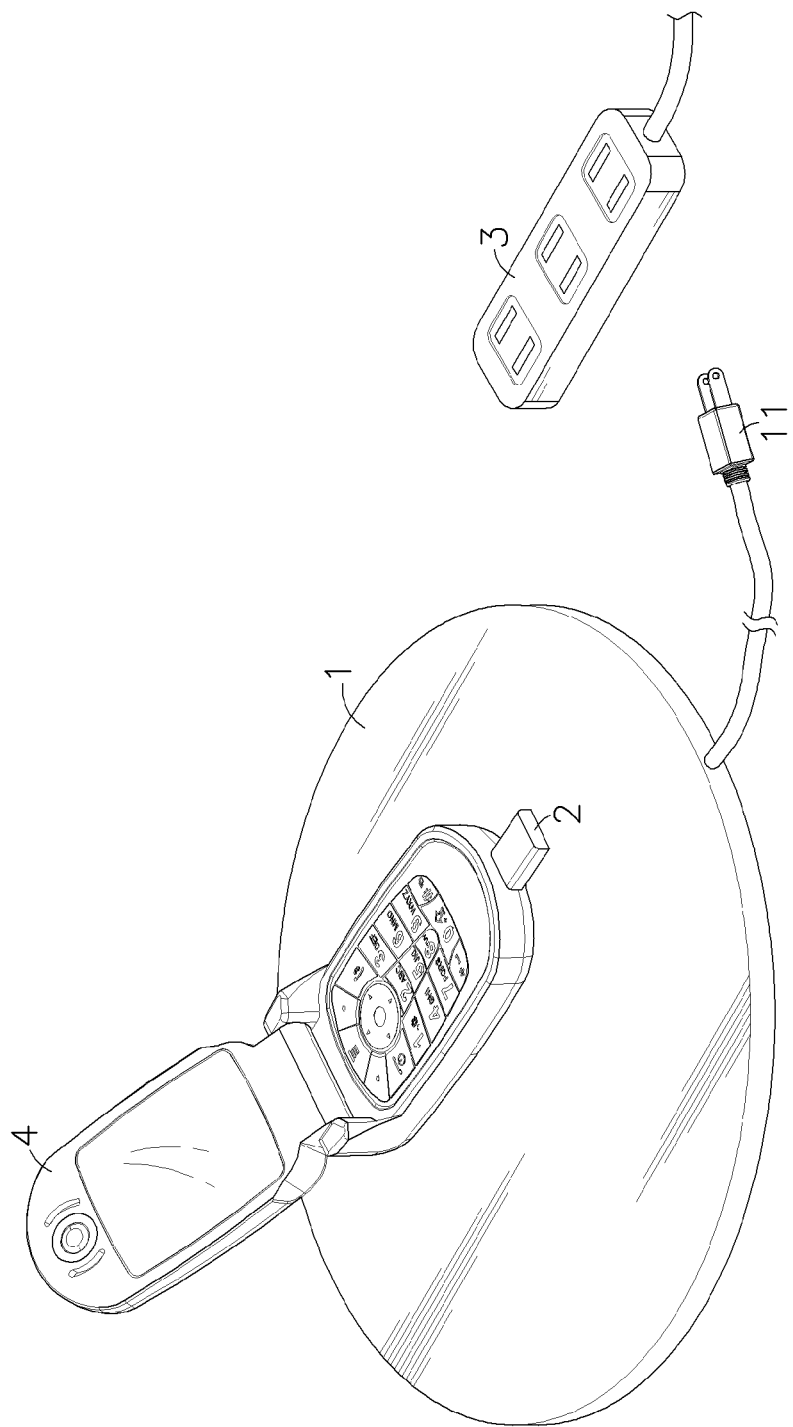
FIG. 4 corresponds to FIG. 3, showing the mobile electronic apparatus connected to the attached induction device.
Figure 5:
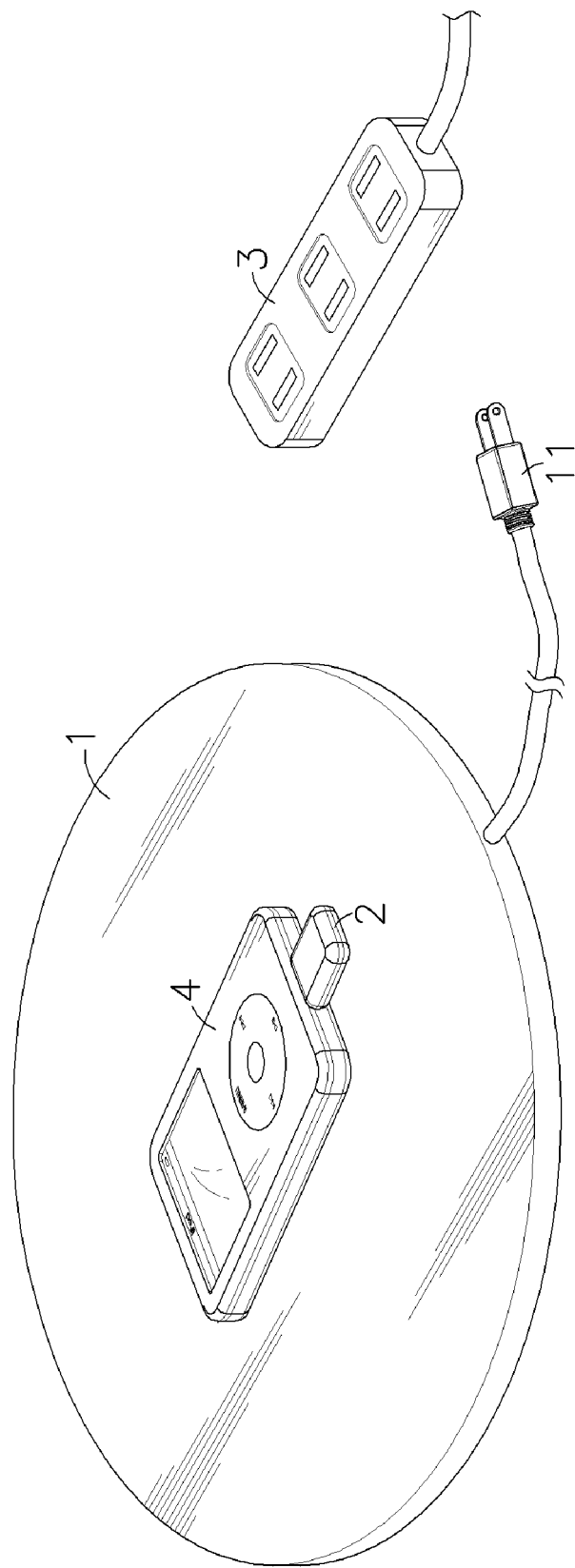
FIG. 5 shows another application example of the induction type power supply device according to the present invention.
Figure 6:
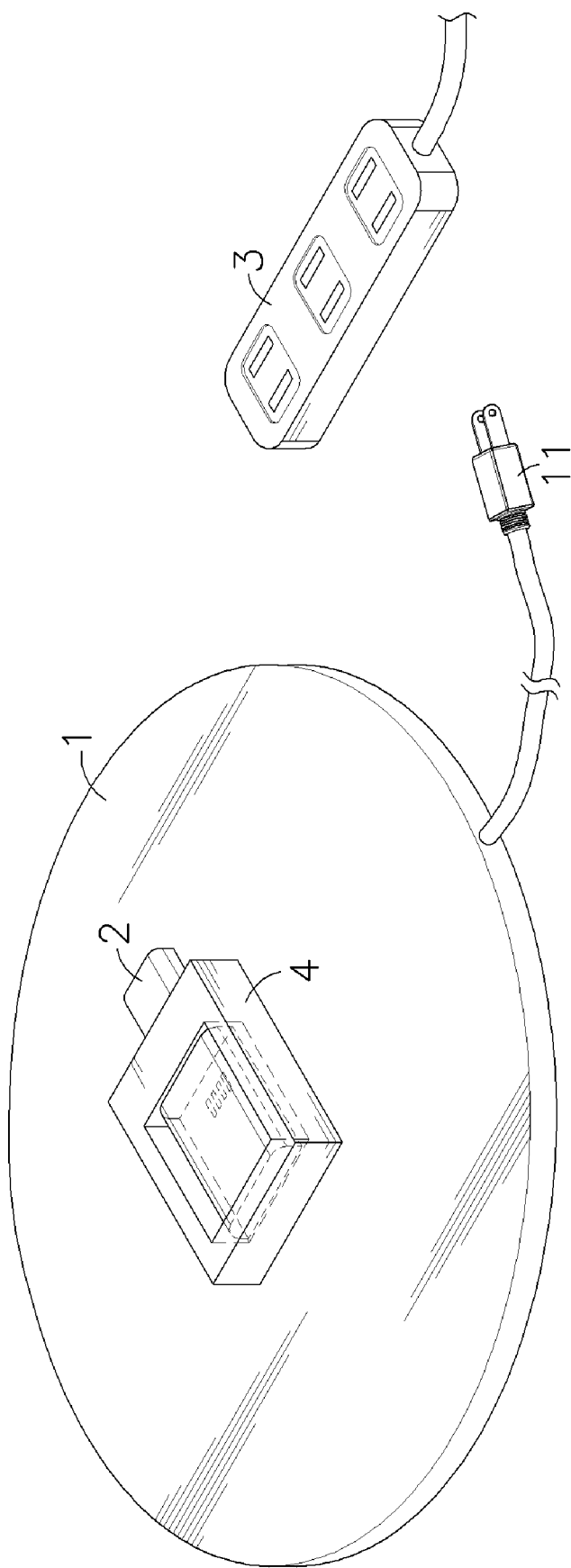
FIG. 6 shows still another application example of the induction type power supply device according to the present invention.

FIG. 2 is a circuit block diagram of an induction type power supply device in accordance with a second embodiment of the present invention. This second embodiment is substantially similar to the aforesaid first embodiment with the exception that the attached induction device 2 according to this second embodiment further comprises a charging module 25 electrically connected in series between the rectifier filter circuit 24 and the power management circuit 26. The charging module 25 comprises a storage battery 252 electrically connected to the power management circuit 26, and a charging circuit 251 electrically connected in series between the rectifier filter circuit 24 and the storage battery 252.

When the secondary coil 22 is set in proximity to the primary coil 142 of the power supply base unit 1, it releases the AC signal to the secondary resonant circuit 23 for converting into DC power supply by the rectifier filter circuit 24. The DC power supply thus obtained is then sent to the charging circuit 251 of the charging module 25 to charge the storage battery 252. When travelling, a user can carry the attached induction device 2 separately and attach a mobile electronic apparatus to the connection device 27 of the attached induction device 2 to obtain the necessary working voltage and current from the storage battery 252 through the power management circuit 26.

Referring to FIGS. 3~6, during application of the present invention, connect the connection interface 11 of the power supply base unit 1 to an electric outlet 3 and the attached induction device 2 to an external mobile electronic apparatus 4 that can be a cellular telephone, music player or any other commercial mini electronic apparatus, and then place the external mobile electronic apparatus 4 with the attached induction device 2 on the power supply base unit 1. By means of magnetic induction between the primary resonant circuit 141 and primary coil 142 of the primary inductor 14 and the secondary coil 22 and secondary resonant circuit 23 of the secondary inductor 21, the attached induction device 2 charges the external mobile electronic apparatus 4 by means of the connection device 27.

Figure 7:
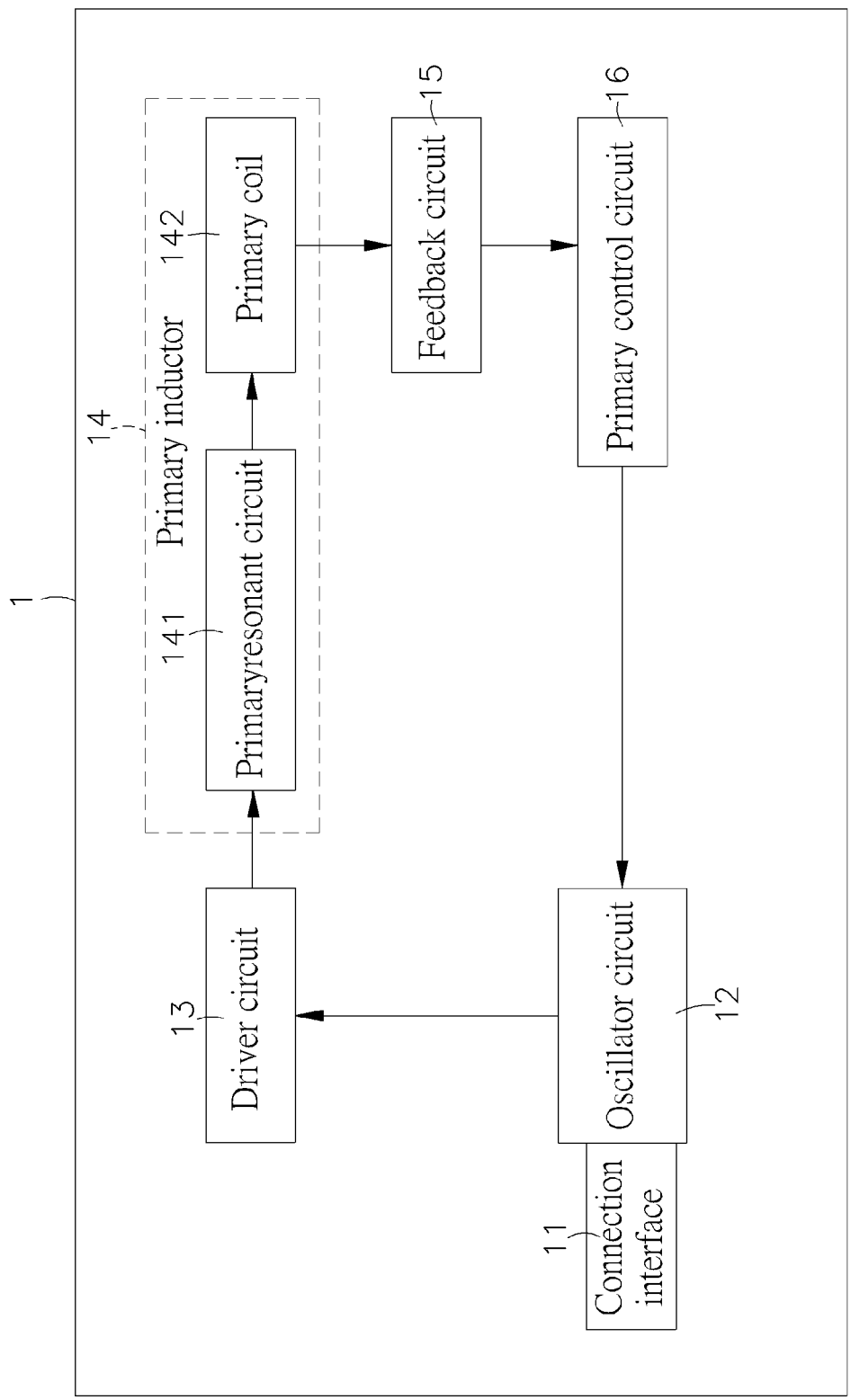
FIG. 7 is a circuit block diagram of a power supply base unit for induction type power supply device in accordance with a third embodiment of the present invention

FIG. 7 is a circuit block diagram of a power supply base unit for induction type power supply device in accordance with a third embodiment of the present invention. According to this third embodiment, the power supply base unit 1 further comprises a feedback circuit 15 and a primary control circuit 16 connected in series between the primary coil 142 and the oscillator circuit 12. During operation, power supply is connected to the oscillator circuit 12 to produce an AC signal, which is amplified by the driver circuit 13 and then sent to the primary resonant circuit 141 to obtain resonance and then to be released through the primary coil 142. At the same time, the feedback circuit 15 feeds back the AC signal to the primary control circuit 16 for voltage/current analysis and comparison with a predetermined reference resonance. After comparison, the primary control circuit 16 outputs a control signal to the oscillator circuit 12 subject to comparison result, causing the oscillator circuit 12 to regulate the optimal resonant frequency. Thus, it is not necessary to add any extra adjusting component to compensate inductor or capacitor performance. In case an extra adjusting component is used, only a skilled professional person can perform the calibration. By means of the aforesaid feedback circuit 15 and primary control circuit 16, the adjustment of the resonant frequency is done automatically. Therefore, the invention greatly simplifies the fabrication of the power supply base unit 1 and improves its yield rate.

Figure 8:
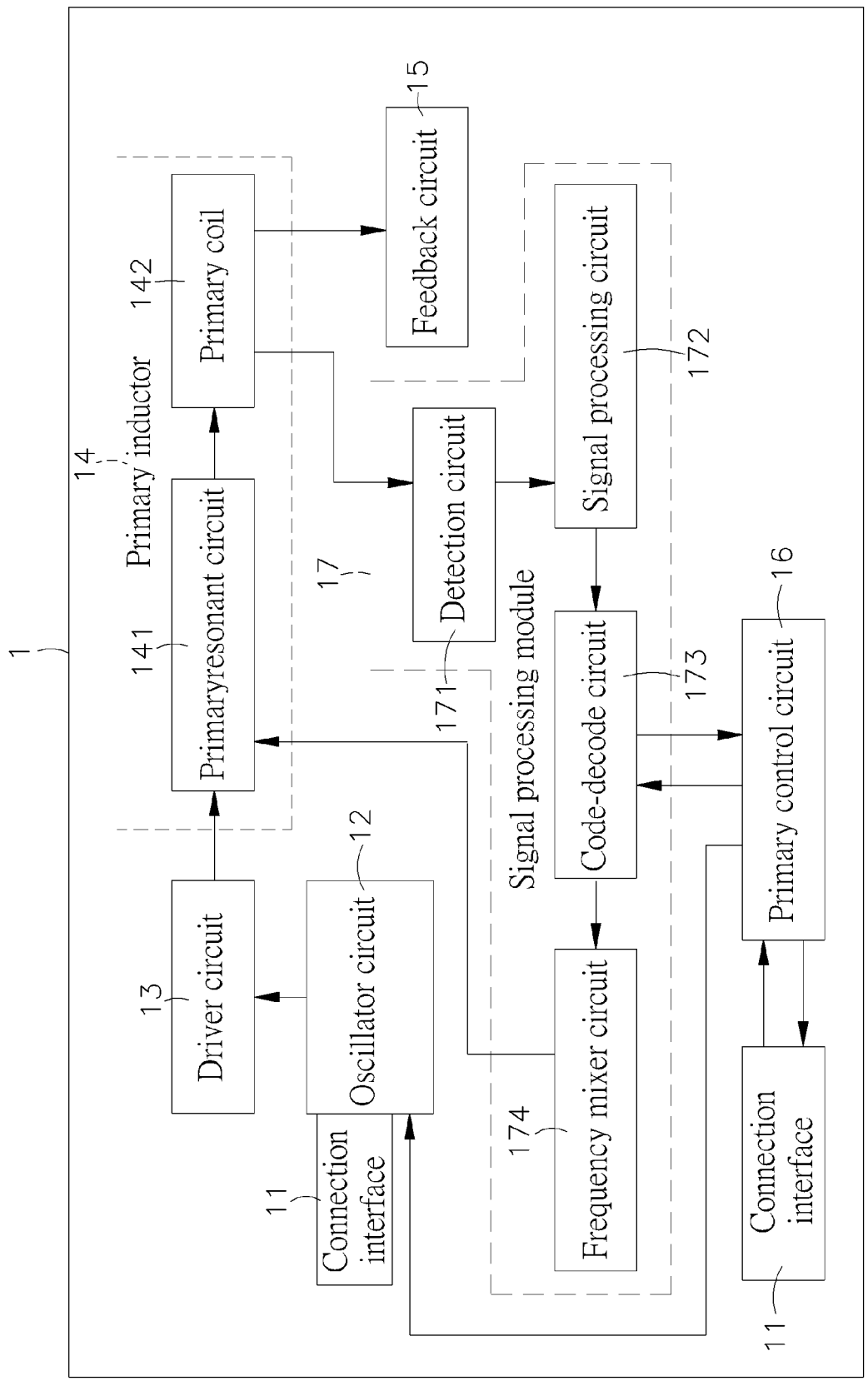
FIG. 8 is a circuit block diagram of a power supply base unit for induction type power supply device in accordance with a fourth embodiment of the present invention.

FIG. 8 is a circuit block diagram of a power supply base unit for induction type power supply device in accordance with a fourth embodiment of the present invention. According to this fourth embodiment, the power supply base unit 1 further comprises a signal processing module 17 electrically connected to the primary coil 142. The signal processing module 17 comprises a detection circuit 171, a signal processing circuit 172, a code-decode circuit 173 and a frequency mixer circuit 174. The detection circuit 171, the signal processing circuit 172, the code-decode circuit 173 and the frequency mixer circuit 174 are connected in series. The frequency mixer circuit 174 is electrically connected to the primary coil 141 of the primary inductor 14. Further, the primary control circuit 16 is electrically connected to the code-encode circuit 173 and the connection interface 11. The connection interface 11 can be a USB (Universal Serial Bus) or Mini USB (Mini Universal Serial Bus). When the connection interface 11 transmits an external media signal to the primary control circuit 16, the primary control circuit 16 converts the media signal into a data signal, and then the code-encode circuit 173 encodes the data signal, and then the frequency signal mixer circuit 174 mixes the encoded data signal with a predetermined radio frequency signal and sends the mixed signal to the primary resonant circuit 141 and then the primary resonant circuit 141 sends the signal to the primary coil 142. The detection circuit 171 is adapted to receive a modulated data signal from the primary coil 142 and to remove the radio frequency signal by means of frequency demodulation, and then to send the demodulated data signal to the signal processing circuit 172 for data processing, enabling the processed signal to be decoded by the encode-decode circuit 173 and sent back to the primary control circuit 16 for converting into a media data for output through the connection interface 11.

Figure 9:
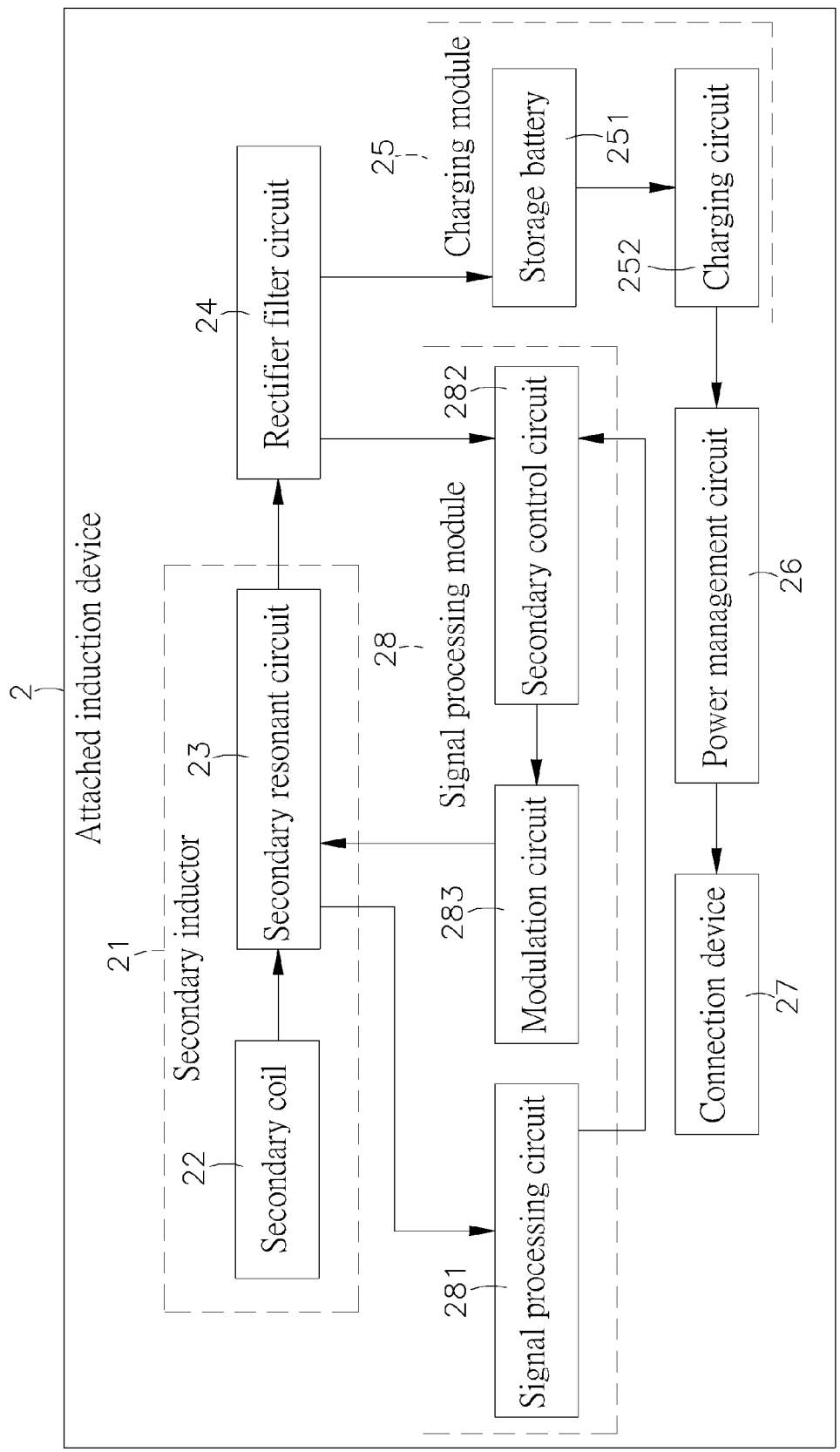
FIG. 9 is a circuit block diagram of an attached induction device for induction type power supply device in accordance with a fifth embodiment of the present invention.

FIG. 9 is a circuit block diagram of an attached induction device for induction type power supply device in accordance with a fifth embodiment of the present invention. According to this embodiment, the attached induction device 2 further comprises a signal processing module 28 electrically connected with the secondary resonant circuit 23. The signal processing module 28 comprises a signal processing circuit 281, a secondary control circuit 282, and a modulation circuit 283 for signal modulation. The modulation circuit 283 is electrically connected to the secondary resonant circuit 23. The secondary control circuit 282 is electrically connected to the rectifier filter circuit 24. When the secondary resonant circuit 23 sends a data signal to the signal processing circuit 281, the signal processing circuit 281 demodulates the data signal and then sends the demodulated data signal to the secondary control circuit 282, which converts the data signal into a media signal for output through the connection device 27.

Referring to FIGS. 8 and 9 again, after connection of an external mobile electronic apparatus to the connection device 27 of the attached induction device 2 and connection of the connection interface 11 of the power supply base unit 1 to a computer, the connection interface 11 of the power supply base unit 1 transmits a data signal to the primary control circuit 16 for converting into a data signal. The converted data signal is then sent by the primary control circuit 16 to the code-encode circuit 173 for encoding. The encoded data signal is then mixed with a radio frequency signal by the frequency mixer circuit 174 and then sent to the primary inductor 14 for transmission to the secondary inductor 21 by means of magnetic induction. Upon receipt of the signal from the primary inductor 14, the secondary inductor 21 sends the data signal to the signal processing circuit 281 for demodulation processing. After demodulation, the signal processing circuit 281 sends the demodulated data signal to the secondary control circuit 282 for converting into a media signal, which is then sent by the secondary control circuit 282 to the external mobile electronic apparatus 4 via the connection device 27.

Figure 10:
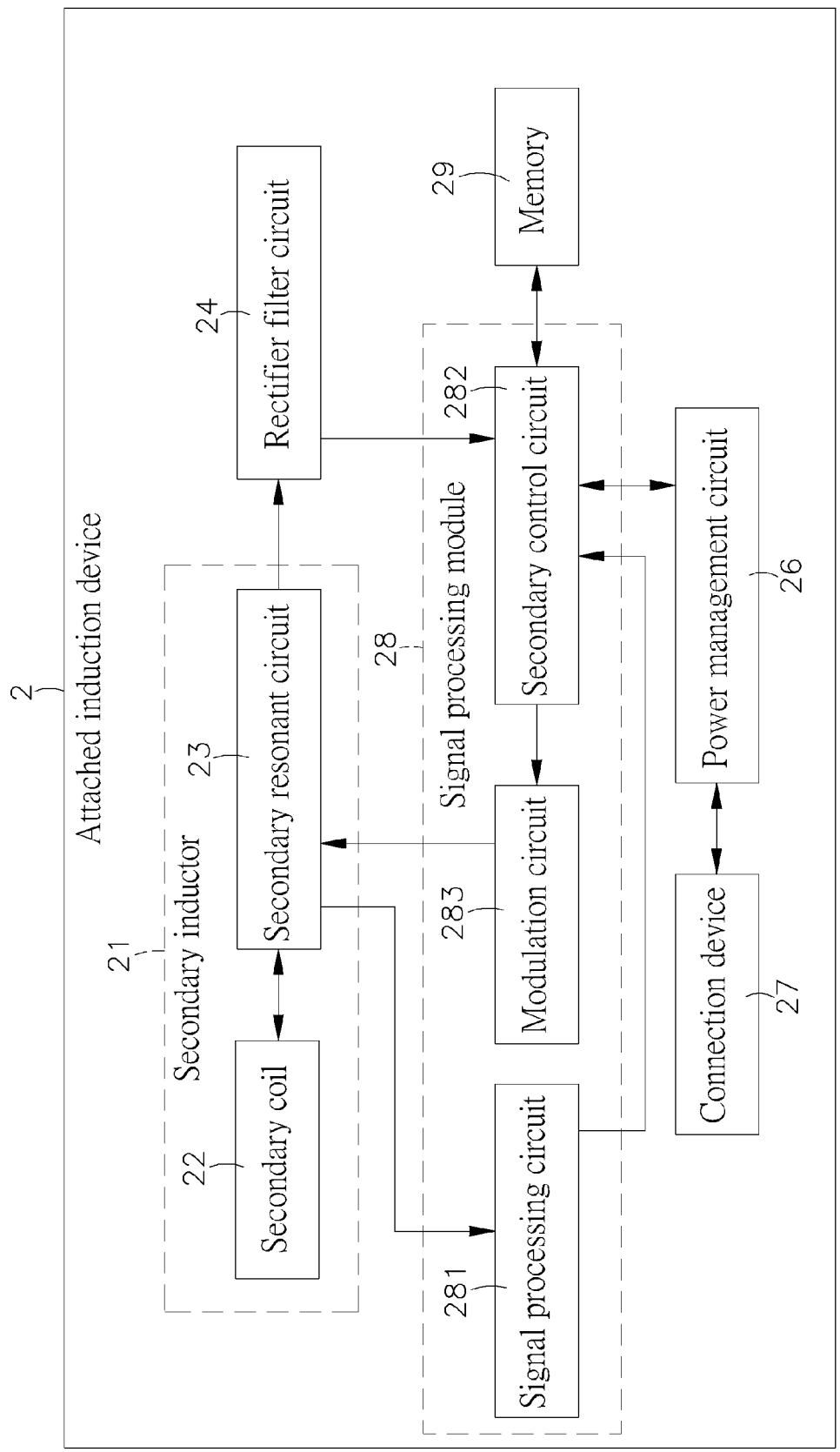
FIG. 10 is a circuit block diagram of an attached induction device for induction type power supply device in accordance with a sixth embodiment of the present invention.
Figure 11:
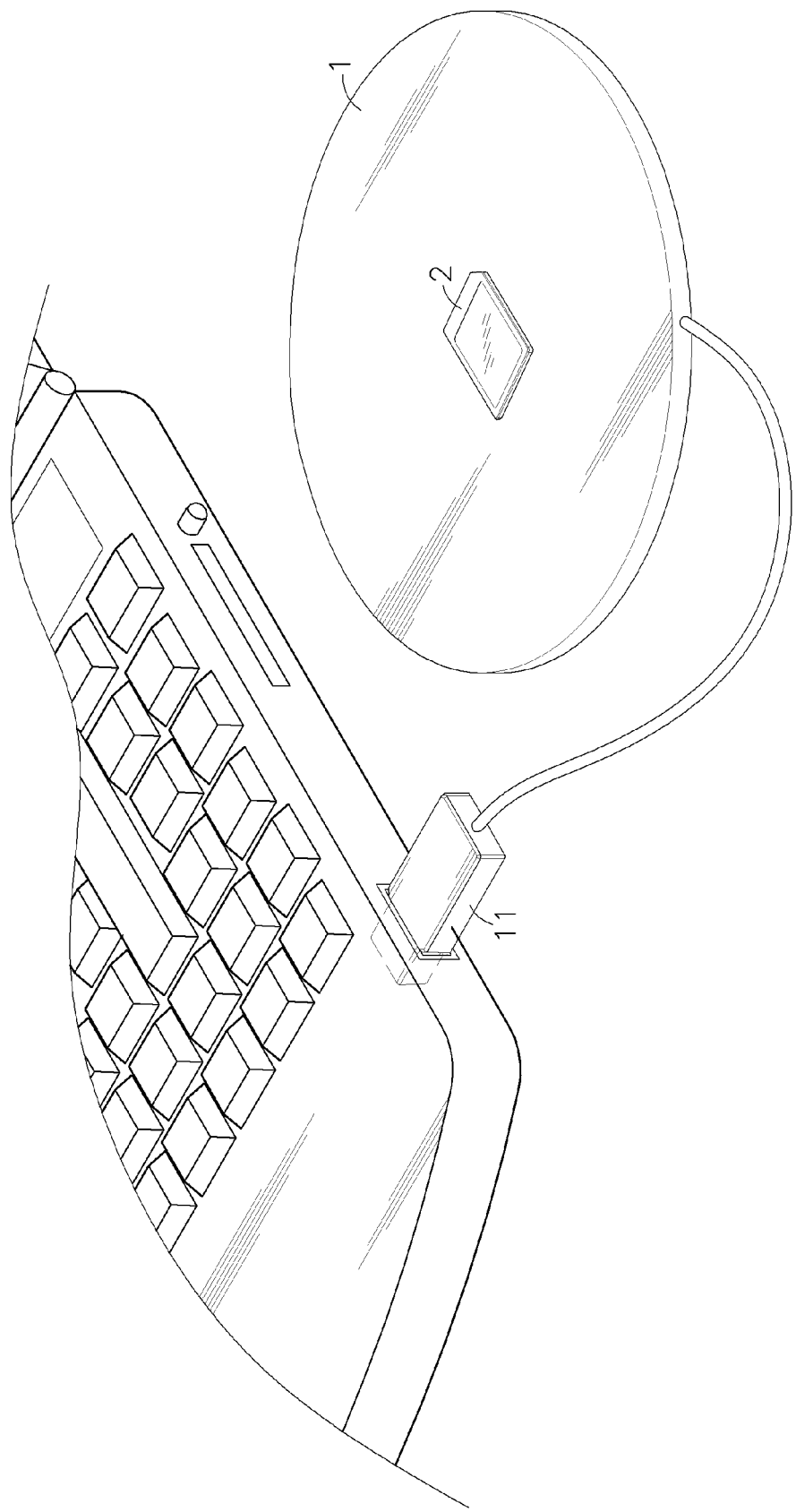
FIG. 11 illustrates an application example of the induction type power supply device in accordance with the sixth embodiment of the present invention.

FIG. 10 is a circuit block diagram of an attached induction device for induction type power supply device in accordance with a sixth embodiment of the present invention. FIG. 11 illustrates an application example of the induction type power supply device in accordance with the sixth embodiment of the present invention. As illustrated in FIG. 10, the attached induction device 2 according to this sixth embodiment is substantially similar to that of the aforesaid fifth embodiment with the exception that this sixth embodiment eliminates the aforesaid charging module 25 and has an extra memory 29 installed therein. The memory 29 is electrically connected with the secondary control circuit 282 of the signal processing module 28. According to this sixth embodiment, the connection interface 11 of the power supply base unit 1 can be connected to a computer (see FIG. 11), allowing the computer to read storage data from the memory 29, to write data into the memory 29, or to make communication with an external mobile electronic apparatus being connected to the connection device 27 of the attached induction device 2. Further, the attached induction device 2 can be made in the shape of a card, memory stick, or any of a variety of other configurations.

In conclusion, the invention provides an induction type power supply device, which has the following advantages and features:

1. The induction type power supply device comprises a power supply base unit 1 carrying a primary coil 142 and an attached induction device 2 carrying a secondary coil 22. After connection of the power supply base unit 1 to an electric outlet 3, power supply is transmitted from the power supply base unit 1 to the attached induction device 2 by means of magnetic induction to charge an external mobile electronic apparatus 4 that is connected to the attached induction device 2. Multiple attached induction device 2 can be used with the power supply base unit 1 to charge multiple external mobile electronic apparatus 4, thereby saving the cost.

2. In one embodiment of the present invention, the attached induction device 2 has installed therein a charging module 25 formed of a charging circuit 251 and a storage battery 252 and electrically connected in series between the rectifier filter circuit 24 and the power management circuit 26. By means of the power supply base unit 1, the storage battery 252 is charged with city power supply. When one goes out, he(she) can carry the attached induction device 2 and use the attached induction device 2 to charge a mobile electronic apparatus 4 in case there is no any electric outlet available.

3. Regular commercial mobile electronic apparatuses generally have at least one USB (Universal Serial Bus) and/or Mini USB (Mini Universal Serial Bus) for communication with external devices. The connection device 27 of the attached induction device 2 is compatible to most commercial mobile electronic apparatus. To fit a particular connection interface of a particular mobile electronic apparatus, a compatible attached induction device 2 can be selected for use with the same power supply base unit 1.

4. In another embodiment of the present invention, the power supply base unit 1 has installed therein a feedback circuit 15, a primary control circuit 16 and an oscillator circuit 12. The feedback circuit 15 feeds back the voltage at the primary resonant circuit 141 to the primary control circuit 16 for voltage analysis. Subject to the analysis result, the primary control circuit 16 controls the oscillator circuit 12 to regulate input AC voltage so that the power supply base unit 1 provides the optimal resonant frequency.

5. When the connection device 27 of the attached induction device 2 is connected to an external mobile electronic apparatus 4 and the connection interface 11 of the power supply base unit 1 is connected to a computer, the connection interface 11 of the power supply base unit 1 transmits a media data signal to the primary control circuit 16 for converting into a data signal, which is then encoded by code-encode circuit 173 and mixed with a radio frequency signal by the frequency mixer circuit 174 and then transmitted by the primary inductor 14 to the secondary inductor 21 by means of resonant induction. Upon receipt of the data signal by the secondary inductor 21, the data signal is sent by the secondary inductor 21 to the signal processing circuit 281 and the secondary control circuit 282 there the data signal is demodulated and converted into a media signal and then transmitted to the external mobile electronic apparatus 4 by the secondary control circuit 282. Thus, the external mobile electronic apparatus 4 can receive data from the computer.

A prototype of induction type power supply device has been constructed with the features of FIGS. 1~11. The induction type power supply device functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An induction type power supply device, comprising:
a power supply base unit, said power supply base unit comprising a connection interface connectable to an electric outlet to obtain city power supply, an oscillator circuit adapted for producing an AC signal upon connection of said connection interface to an electric outlet, a driver circuit adapted for amplifying said AC signal, and a primary inductor adapted for obtaining a resonant frequency and releasing said AC signal; and
an attached induction device, said attached induction device comprising a secondary inductor adapted for receiving said AC signal from said primary inductor by means of magnetic induction, a rectifier filter circuit adapted for converting said AC signal into a DC power supply, a power management circuit adapted for regulating said DC power supply subject to a predetermined voltage and current value, and a connection device for the connection of an external mobile electronic apparatus and for outputting the regulated DC power supply from said power management circuit to the connected external mobile electronic apparatus;
wherein said primary inductor comprises a primary resonant circuit adapted to obtain resonance, and a primary coil adapted for receiving said AC signal from said primary resonant circuit and transmitting said AC signal to said secondary inductor of said attached induction device; and
wherein said power supply base unit further comprises a feedback circuit and a primary control circuit, said feedback circuit feeding back said AC signal to said primary control circuit for analysis and comparison with a predetermined reference resonance, said primary control circuit outputting a control signal to said oscillator circuit to regulate the resonant frequency subject to the comparison result made.

2. The induction type power supply device as claimed in claim 1, wherein said attached induction device further comprises a charging module electrically connected in series between said rectifier filter circuit and said power management circuit, said charging module comprising a storage battery electrically connected to said power management circuit for power output and a charging circuit adapted for charging said storage battery with the DC power supply outputted by said rectifier filter circuit.

3. The induction type power supply device as claimed in claim 1, wherein said induction device is a universal serial bus.

4. The induction type power supply device as claimed in claim 1, wherein said induction device is a mini universal serial bus.

5. The induction type power supply device as claimed in claim 1, wherein said mobile electronic apparatus is a digital camera.

6. The induction type power supply device as claimed in claim 1, wherein said mobile electronic apparatus is a cellular telephone.

7. The induction type power supply device as claimed in claim 1, wherein said mobile electronic apparatus is a music player.

8. The induction type power supply device as claimed in claim 1, wherein said power supply base unit further comprises a signal processing module, said signal processing module comprising a detection circuit, a signal processing circuit, a code-decode circuit and a frequency mixer circuit connected in series; when said connection interface transmits an external media signal to said primary control circuit, said primary control circuit converts the media signal into a data signal, and then said code-encode circuit encodes the data signal, and then said frequency signal mixer circuit mixes the encoded data signal with a predetermined radio frequency signal and sends the mixed signal to said primary inductor; said detection circuit is adapted to receive a modulated data signal from said primary inductor and to remove the radio frequency signal by means of frequency demodulation, and then to send the demodulated data signal to said signal processing circuit, which processes the data signal for enabling the data signal to be decoded by said encode-decode circuit and sent back to said primary control circuit for converting into a media data for output through said connection interface.

9. The induction type power supply device as claimed in claim 1, wherein said attached induction device further comprises a signal processing module, said signal processing module comprising a signal processing circuit adapted to receive a modulated data signal from said secondary inductor and to demodulate the data signal, and a secondary control circuit adapted to convert the data signal into a media signal for output through said connection device.

10. The induction type power supply device as claimed in claim 9, wherein said attached induction device further comprises a memory electrically connected with said secondary control circuit.

* * * * *